(12) United States Patent
Li et al.

(10) Patent No.: US 9,913,291 B2
(45) Date of Patent: Mar. 6, 2018

(54) CHANNEL DETECTION METHOD, TERMINAL AND SYSTEM

(71) Applicant: ZTE Corporation, Shenzhen, Guangdong (CN)

(72) Inventors: Nan Li, Shenzhen (CN); Kaiying Lv, Shenzhen (CN); Anming Jiang, Shenzhen (CN); Bo Sun, Shenzhen (CN); Kaibo Tian, Shenzhen (CN); Ke Yao, Shenzhen (CN); Zhiqiang Han, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/123,105

(22) PCT Filed: Aug. 20, 2014

(86) PCT No.: PCT/CN2014/084830
§ 371 (c)(1),
(2) Date: Sep. 1, 2016

(87) PCT Pub. No.: WO2015/131500
PCT Pub. Date: Sep. 11, 2015

(65) Prior Publication Data
US 2017/0079067 A1    Mar. 16, 2017

(30) Foreign Application Priority Data
Mar. 3, 2014   (CN) .......................... 2014 1 0075793

(51) Int. Cl.
*H04W 72/08*   (2009.01)
*H04W 74/00*   (2009.01)
(Continued)

(52) U.S. Cl.
CPC ......... *H04W 74/006* (2013.01); *H04W 24/02* (2013.01); *H04W 48/10* (2013.01);
(Continued)

(58) Field of Classification Search
CPC ... H04W 24/02; H04W 48/10; H04W 72/085; H04W 84/12; H04W 48/16; H04W 72/005; H04W 74/006
See application file for complete search history.

(56) References Cited

U.S. PATENT DOCUMENTS

2005/0226270 A1   10/2005  Liu
2007/0060155 A1*   3/2007  Kahana ............... H04W 72/085
                                                      455/450
(Continued)

FOREIGN PATENT DOCUMENTS

CN    1751464 A    3/2006
CN    1762115 A    4/2006
(Continued)

OTHER PUBLICATIONS

International Search Report in international application No. PCT/CN2014/084830, dated Nov. 26, 2014, 6 pgs.
(Continued)

Primary Examiner — Lakeram Jangbahadur
(74) Attorney, Agent, or Firm — Cooper Legal Group, LLC (57) ABSTRACT

Provided are a channel detection method, terminal and system, the method comprising: when an access point allows a station associated therewith to use a dynamic channel detection threshold, the associated station collects detection information (101); according to the detection information, the associated station determines whether to use the dynamic channel detection threshold to conduct channel detection (102).

15 Claims, 3 Drawing Sheets (51) Int. Cl.
*H04W 24/02* (2009.01)
*H04W 48/16* (2009.01)
*H04W 48/10* (2009.01)
*H04W 72/00* (2009.01)
*H04W 84/12* (2009.01)

(52) U.S. Cl.
CPC ......... *H04W 48/16* (2013.01); *H04W 72/005* (2013.01); *H04W 72/085* (2013.01); *H04W 84/12* (2013.01)

(56) References Cited

U.S. PATENT DOCUMENTS

| | | | |
|---|---|---|---|
| 2007/0264950 A1* | 11/2007 | Husted | H03G 3/3068 455/136 |
| 2008/0008133 A1 | 1/2008 | Zhu | |
| 2011/0136456 A1* | 6/2011 | Deshpande | H04W 52/0261 455/226.1 |
| 2013/0017794 A1 | 1/2013 | Kloper | |

FOREIGN PATENT DOCUMENTS

| | | |
|---|---|---|
| CN | 1767685 A | 5/2006 |
| CN | 101253784 A | 8/2008 |
| CN | 101662796 A | 3/2010 |
| CN | 102640551 A | 8/2012 |

OTHER PUBLICATIONS

English Translation of the Written Opinion of the International Search Authority in international application No. PCT/CN2014/084830, dated Nov. 26, 2014, 12 pgs.

Supplementary European Search Report in European application No. 1488471.8, dated Jan. 25, 2017, 9 pgs.

"Dynamic Sensitivity Control", Graham Smith, Nov. 2013, IEEE Draft: 11-13-1 012-04-0WNG-DYNAMIC-SENSITIVITY-CONTROL. IEEE—SA Mentor. Piscataway, NJ USA, vol. 802.11 WNG, No. 4, 30 pgs.

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications" Jun. 12, 2007, IEEE Computer Society, pp. 1-292.

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications" Jun. 12, 2007, IEEE Computer Society, pp. 293-584.

* cited by examiner

CHANNEL DETECTION METHOD, TERMINAL AND SYSTEM

TECHNICAL FIELD

The disclosure relates to a detection technology in the field of wireless communication, and in particular to a method, a terminal and a system for channel detection.

BACKGROUND

In a process of implementing the technical solutions of the embodiment of the disclosure, the inventor of the disclosure found that a conventional art at least has the following technical problems.

In a wireless communication technology, a Wireless Local Area Network (WLAN) consistent with standard Institute of Electrical and Electronic Engineers (IEEE) 802.11 has been used most widely, and it is not only used for laptop computers, handheld apparatus and mobile terminals in various special environments, but also is considered to be used in a technology of hotspot access with the Internet in a 3rd Generation Partnership Project (3GPP) system of a cellular network. The IEEE 802.11 working group defines a series of WLAN technical standards such as 802.11a, 802.11b and 802.11g, and then other task group devoted to developing specifications involving technical improvements of existing 802.11 appear one after another. For example, the 802.11n task group expresses a requirement on High Throughput (HT) to support a data rate of 600 Mbps. The 802.11ac task group proposes the concept of Very High Throughput (VHT) to increase the data rate to 1 Gbps. Other 802.11-series protocols further include 802.11ad supporting work in 60 GHz and 802.11ah supporting work below 1 GHz.

In 802.11, an Access Point (AP) and multiple non-AP Stations (STAs) associated with the AP form a Basic Service Set (BSS). At present, 802.11 supports two method, virtual carrier detection and physical carrier detection, for determining whether a channel is clear, and only when a channel is determined to be clear by both virtual carrier detection and physical carrier detection, STAs may compete for sending. Virtual carrier detection refers to that a third-party STA except both parties involved in communication sets a value of a local Network Allocation Vector (NAV) according to a duration field in a radio frame when receiving the radio frame of which a receiving address is not the third-party STA, and when the NAV is not zero, determines that a channel is busy and does not compete for sending. Physical carrier detection refers to channel detection technology of Clear Channel Assessment (CCA), and an associated STA detects strength of a signal of a medium to judge whether a channel is busy or clear. Specifically, an associated STA sets different detection thresholds for different channel bandwidths, and for example, a signal detection threshold for a 20 MHz channel set by the associated STA is −82 dBm, and a signal detection threshold for a 40 MHz channel set by the associated STA is −79 dBm. On a 20 MHz channel, if a received signal is an 802.11 signal and its strength is higher than −82 dBm, it is determined that the channel is busy and a physical layer of an associated STA sends an indicator about a busy state of the channel to a Media Access Control (MAC) layer. When the received signal is an 802.11 signal and its strength is lower than −82 dBm, it is determined that the channel is clear and the physical layer of the associated STA may send an indicator about a clear state of the channel to the MAC layer.

Figure 1:
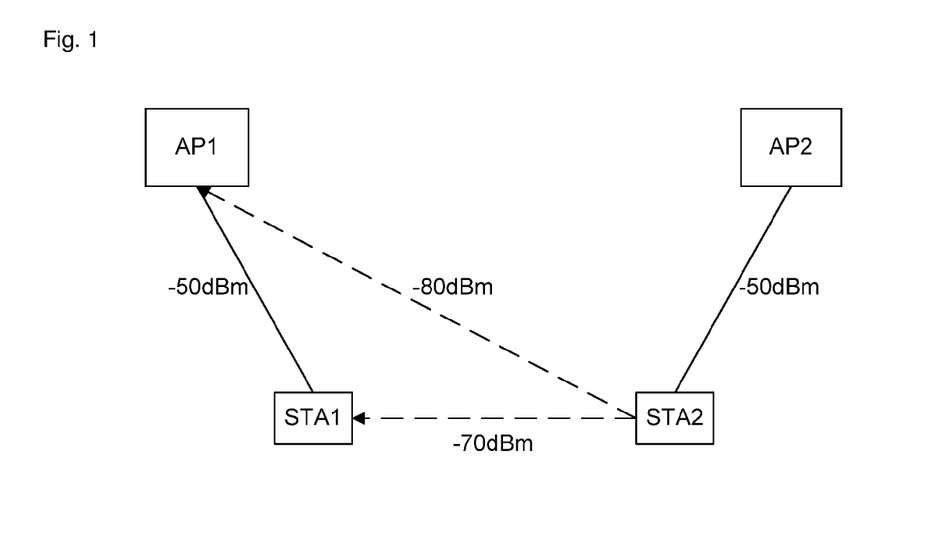
FIG. 1 is a schematic diagram of an existing CCA detection mechanism.

Existing CCA has problems as follows. As shown in FIG. 1, STA1 is associated with AP1, STA2 is associated with AP2, and FIG. 1 shows strength of a signal received from each other. When STA1 sends a signal to AP1, if STA2 receives the signal of STA1 and strength of the signal is higher than a detection threshold −82 dBm, STA2 determines that a channel is busy, so that STA2 will not send any signal to AP2. Actually, if STA2 sends a signal to AP2, there may not be any interference to reception of AP1 and AP2 can successfully receive the signal of STA2, because strength of the signal of STA2 arriving at AP1 is far lower than the strength of the signal of STA1 arriving at AP1. As can be seen, an excessively high CCA detection threshold results in a detection result that the channel is busy for STA2 and reduces a sending chance of STA2.

From the above, adoption of a fixed-threshold-based CCA technology for channel detection may cause problems. Although a dynamic channel detection threshold mechanism proposed at present may increase sending chances by adopting variable detection thresholds for performing the channel detection, keeping adopting the variable detection thresholds may also cause some problems. That is, adopting fixed detection thresholds and keeping adopting dynamic channel detection thresholds both have problems. In a related technology, for the problem of how to use a detection threshold for performing the channel detection, there is yet no effective solution.

SUMMARY

In view of this, the disclosure is intended to provide a method, apparatus and a system for channel detection, which at least solve the problem of how to use a detection threshold for performing the channel detection.

The technical solutions of the disclosure are implemented as follows.

The embodiment of the disclosure provides a method for channel detection, which may include that:

when an AP allows an associated STA associated with it to use a dynamic channel detection threshold, the associated STA collects detection information; and the associated STA judges whether to use the dynamic channel detection threshold for performing the channel detection or not according to the detection information.

Alternatively, the detection information may include at least one of information for identifying Basic Service Set (BSS) of a received frame, uplink and downlink indication information of the received frame, strength of a received signal from an adjacent BSS and strength of a received signal from an associated BSS Alternatively, the information for identifying BSS of the received frame may be information for distinguishing different BSSs from each other, and the information is in at least one of:

Manner 1: a preamble sequence of a physical layer of the radio frame; and

Manner 2: signaling of the physical layer or Media Access Control (MAC) layer of the radio frame.

Alternatively, the uplink and downlink indication information of the received frame may be information for distinguishing an uplink frame from a downlink frame;

the frames may include an uplink frame which may be a frame sent to the AP by the associated STA, and a downlink frame which may be a frame sent to the associated STA by the AP; and the uplink frame may be distinguished from the downlink frame through the signaling of the physical layer or MAC layer of the radio frame.

Alternatively, the strength of the received signal from the adjacent BSS may be strength of a received signal received by the associated STA from an AP of the adjacent BSS and/or strength of a received signal received by the associated STA from a STA associated with an AP of the adjacent BSS.

Alternatively, the strength of the received signal from the associated BSS may be strength of a received signal received by the associated STA from an AP of the associated BSS.

Alternatively, the associated STA may receive one or more pieces of detection information notified by the AP in a broadcast manner and used by the associated STA and a set of dynamic threshold parameters corresponding to the one or more pieces of detection information.

Alternatively, the set of dynamic threshold parameters may be a set of one or more parameters; and the method may further include that: the associated STA can determines a value of the dynamic channel detection threshold by using the set of dynamic threshold parameters.

Alternatively, the method may further include that: the associated STA indicates capability information about whether it supports the dynamic channel detection threshold or not to the AP.

Alternatively, the step that the associated STA judges whether to use the dynamic channel detection threshold for performing the channel detection or not according to the detection information may include that:

when the detection information is the information for identifying BSS of the received frame and the associated STA identifies that the information for identifying BSS of the received frame indicates that the received frame is a frame from the adjacent BSS, the associated STA determines to use the set of dynamic threshold parameters as the dynamic channel detection threshold for performing the channel detection.

Alternatively, the step that the associated STA judges whether to use the dynamic channel detection threshold for performing the channel detection or not according to the detection information may include that:

when the detection information is the information for identifying BSS of the received frame, the strength of the received signal from the adjacent BSS and the strength of the received signal from the associated BSS, and the associated STA identifies that the information for identifying BSS of the received frame indicates that the received frame is the frame from the adjacent BSS, the associated STA takes the strength of the received signal from the adjacent BSS or the strength of the received signal from the associated BSS as a reference value, or takes a result obtained by specified operation over the strength of the received signal from the adjacent BSS and the strength of the received signal from the associated BSS as the reference value; and the reference value is compared with a threshold value to obtain a result of the comparison, and it is determined whether to use the set of dynamic threshold parameters as the dynamic channel detection threshold for performing the channel detection according to the result of the comparison.

Alternatively, the step that the associated STA judges whether to use the dynamic channel detection threshold for performing the channel detection or not according to the detection information may include that:

when the detection information is the information for identifying BSS of the received frame and the uplink and downlink indication information of the received frame, and the associated STA identifies that the information for identifying BSS of the received frame indicates that the received frame is the frame from the adjacent BSS and the uplink and downlink indication information of the received frame indicates that the received frame is an uplink frame, the associated STA determines to use the set of dynamic threshold parameters as the dynamic channel detection threshold for performing the channel detection.

Alternatively, the step that the associated STA judges whether to use the dynamic channel detection threshold for performing the channel detection or not according to the detection information may include that:

when the detection information is the information for identifying BSS of the received frame, the uplink and downlink indication information of the received frame, the strength of the received signal from the adjacent BSS and the strength of the received signal from the associated BSS, and the associated STA identifies that the information for identifying BSS of the received frame indicates that the received frame is the frame from the adjacent BSS and the uplink and downlink indication information of the received frame indicates that the received frame is an uplink frame, the associated STA takes the strength of the received signal from the adjacent BSS or the strength of the received signal from the associated BSS as a reference value, or takes a result obtained by specified operation over the strength of the received signal from the adjacent BSS and the strength of the received signal from the associated BSS as the reference value; and the reference value is compared with a threshold value to obtain a result of the comparison, and it is determined whether to use the set of dynamic threshold parameters as the dynamic channel detection threshold for performing the channel detection according to the result of the comparison.

The embodiment of the disclosure provides a method for channel detection, which may include that:

when an AP allows an associated STA associated with it to use a dynamic channel detection threshold, the AP sends one or more pieces of detection information used by the associated STA and a set of dynamic threshold parameters corresponding to the one or more pieces of detection information.

The embodiment of the disclosure provides a receiving terminal, which may include:

a collection unit configured to, when an AP allows an associated STA associated with it to use a dynamic channel detection threshold, collect detection information; and a processing unit configured to judge whether to use the dynamic channel detection threshold for performing the channel detection or not according to the detection information.

Alternatively, when the processing unit is configured to judge whether to use the dynamic channel detection threshold for performing the channel detection or not according to the detection information, the detection information being used may include at least one of information for identifying BSS of a received frame, uplink and downlink indication information of the received frame, strength of a received signal from an adjacent BSS and strength of a received signal from an associated BSS.

Alternatively, when the processing unit is configured to judge whether to use the dynamic channel detection threshold for performing the channel detection or not according to the detection information, the detection information being used may be the information for identifying BSS of the received frame which may be information for distinguishing different BSSs from each other, and the information may be in at least one of:

Manner 1: a preamble sequence of a physical layer of the radio frame; and

Manner 2: signaling of the physical layer or MAC layer of the radio frame.

Alternatively, when the processing unit is configured to judge whether to use the dynamic channel detection threshold for performing the channel detection or not according to the detection information, the detection information being used may be the uplink and downlink indication information of the received frame which may be information for distinguishing an uplink frame from a downlink frame;

the frames may include an uplink frame which may be a frame sent to the AP by the associated STA, and a downlink frame which may be a frame sent to the associated STA by the AP; and the uplink frame may distinguished from the downlink frame through the signaling of the physical layer or MAC layer of the radio frame.

Alternatively, when the processing unit is configured to judge whether to use the dynamic channel detection threshold for performing the channel detection or not according to the detection information, the detection information being used may be the strength of the received signal from the adjacent BSS, and the strength of the received signal from the adjacent BSS may be strength of a received signal received by the associated STA from an AP of the adjacent BSS and/or strength of a received signal received by the associated STA from a STA associated with an AP of the adjacent BSS.

Alternatively, when the processing unit is configured to judge whether to use the dynamic channel detection threshold for performing the channel detection or not according to the detection information, the detection information being used may be the strength of the received signal from the associated BSS which may be strength of a received signal received by the associated STA from an AP of the associated BSS.

Alternatively, the receiving terminal may further include a receiving unit, which may be configured to receive one or more pieces of detection information notified by the AP in a broadcast manner and used by the associated STA and a set of dynamic threshold parameters corresponding to the one or more pieces of detection information.

Alternatively, the receiving unit may further be configured to receive a set of one or more parameters which may be taken as the set of dynamic threshold parameters; and the receiving terminal may further include a first determination unit which may be configured to determine a value of the dynamic channel detection threshold by using the set of dynamic threshold parameters.

Alternatively, the processing unit may further be configured to, when the detection information is the information for identifying BSS of the received frame and it is identified that the information for identifying BSS of the received frame indicates that the received frame is a frame from the adjacent BSS, determine to use the set of dynamic threshold parameters as the dynamic channel detection threshold for performing the channel detection.

Alternatively, the processing unit may further be configured to, when the detection information is the information for identifying BSS of the received frame, the strength of the received signal from the adjacent BSS and the strength of the received signal from the associated BSS, and it is identified that the information for identifying BSS of the received frame indicates that the received frame is the frame from the adjacent BSS, take the strength of the received signal from the adjacent BSS or the strength of the received signal from the associated BSS as a reference value, or take a result obtained by specified operation over the strength of the received signal from the adjacent BSS and the strength of the received signal from the associated BSS as the reference value; and compare the reference value with a threshold value to obtain a result of the comparison, and determine whether to use the set of dynamic threshold parameters as the dynamic channel detection threshold for performing the channel detection according to the result of the comparison.

Alternatively, the processing unit may further be configured to, when the detection information is the information for identifying BSS of the received frame and the uplink and downlink indication information of the received frame, and it is identified that the information for identifying BSS of the received frame indicates that the received frame is the frame from the adjacent BSS and the uplink and downlink indication information of the received frame indicates that the received frame is an uplink frame, determine to use the set of dynamic threshold parameters as the dynamic channel detection threshold for performing the channel detection.

Alternatively, the processing unit may further be configured to, when the detection information is the information for identifying BSS of the received frame, the uplink and downlink indication information of the received frame, the strength of the received signal from the adjacent BSS and the strength of the received signal from the associated BSS, and it is identified that the information for identifying BSS of the received frame indicates that the received frame is the frame from the adjacent BSS and the uplink and downlink indication information of the received frame indicates that the received frame is an uplink frame, take the strength of the received signal from the adjacent BSS or the strength of the received signal from the associated BSS as a reference value, or take a result obtained by specified operation over the strength of the received signal from the adjacent BSS and the strength of the received signal from the associated BSS as the reference value; and compare the reference value with a threshold value to obtain a result of the comparison, and determine whether to use the set of dynamic threshold parameters as the dynamic channel detection threshold for performing the channel detection according to the result of the comparison.

When performing processing, the collection unit, the processing unit, the receiving unit and the first determination unit may be implemented by a Central Processing Unit (CPU), a Digital Signal Processor (DSP) or a Field-Programmable Gate Array (FPGA).

The embodiment of the disclosure provides a sending terminal, which may include:

a sending unit configured to, when an AP allows an associated STA associated with it to use a dynamic channel detection threshold, send one or more pieces of detection information used by the associated STA and a set of dynamic threshold parameters corresponding to the one or more pieces of detection information.

When performing processing, the sending unit may be implemented by a CPU, a DSP or an FPGA.

The embodiment of the disclosure provides a system, which may include the receiving terminal and sending terminal mentioned in any aforementioned item.

According to the method of the embodiment of the disclosure, when the AP allows the associated STA associated with it to use the dynamic channel detection threshold, the associated STA collects the detection information; and the associated STA judges whether to use the dynamic channel detection threshold for performing the channel detection or not according to the detection information. With adoption of the method of the disclosure, the associated STA may judge whether to use the dynamic channel detection threshold for performing the channel detection or not according to the detection information sent by the AP, so that the problem of how to use a detection threshold for performing the channel detection is solved.

DETAILED DESCRIPTION

Implementation of the technical solutions will be further described in detail below with reference to the drawings.

Since the CCA technology utilizing a fixed threshold for performing channel detection in the conventional art may cause some problems, a dynamic channel detection threshold mechanism is introduced. A main idea of the mechanism is as follows: an associated STA (such as an STA) associated with an accessing STA (such as an AP) may adopt a variable detection threshold when receiving a signal and judging whether a channel is clear or not. The associated STA may increase a channel detection threshold to shield signals lower than the detection threshold and increase sending chances. However, keeping adopting such a dynamic detection threshold technology may also cause certain influence. If all associated STAs adopt dynamic detection thresholds and keep increasing own detection thresholds, there may probably be excessive hidden associated STAs and thus a collision probability may be increased.

In addition, if the same AP has an associated STA which does not support such a function, judgments of an associated STA which supports the function and the associated STA which does not support the function about whether a channel is clear or not may be inconsistent with each other, which may cause a problem about channel access fairness of the two kinds of associated STAs.

As can be seen, adopting fixed detection thresholds and keeping adopting dynamic channel detection thresholds both have problems. To solve the problem of how to utilize a detection threshold for performing the channel detection and particularly the problem of how a terminal will utilize a dynamic channel detection threshold, the disclosure discloses a novel mechanism relating to dynamic channel detection threshold. The novel mechanism relating to dynamic channel detection threshold of the disclosure includes contents as follows.

Figure 2:
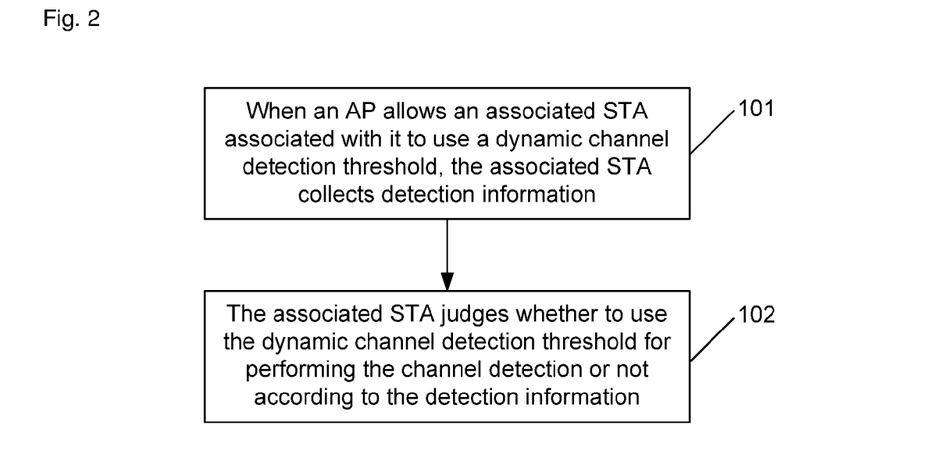
FIG. 2 is a flowchart of an implementation of a method according to the disclosure.

For a receiver, there is provided a method for channel detection, as shown in FIG. 2, including the following steps:

In Step 101, when an AP allows an associated STA associated with it to use a dynamic channel detection threshold, the associated STA collects detection information; and In Step 102, the associated STA judges whether to use the dynamic channel detection threshold for performing the channel detection or not according to the detection information.

Here, using the dynamic channel detection threshold for performing the channel detection may be using the dynamic channel detection threshold for CCA channel detection. In an alternative implementation of the disclosure, the detection information includes at least one of information for identifying BSS of a received frame, uplink and downlink indication information of the received frame, strength of a received signal from an adjacent BSS and strength of a received signal from an associated BSS.

In a alternative implementation of the disclosure, the information for identifying BSS of the received frame is information for distinguishing different BSSs from each other, and the information is in at least one of:

Manner 1: a preamble sequence of a physical layer of the radio frame; and

Manner 2: signaling of the physical layer or MAC layer of the radio frame.

In an alternative implementation of the disclosure, the uplink and downlink indication information of the received frame is information for distinguishing an uplink frame from a downlink frame.

The frames include an uplink frame which is a frame sent to the AP by the associated STA, and a downlink frame which is a frame sent to the associated STA by the AP.

The uplink frame is distinguished from the downlink frame through the signaling of the physical layer or MAC layer of the radio frame.

In an alternative implementation of the disclosure, the strength of the received signal from the adjacent BSS is strength of a received signal received by the associated STA from an AP of the adjacent BSS and/or strength of a received signal received by the associated STA from a STA associated with an AP of the adjacent BSS.

In an alternative implementation of the disclosure, the strength of the received signal from the associated BSS is strength of a received signal received by the associated STA from an AP of the associated BSS.

In an alternative implementation of the disclosure, the associated STA receives one or more pieces of detection information notified by the AP in a broadcast manner and used by the associated STA and a set of dynamic threshold parameters corresponding to the one or more pieces of detection information.

In an alternative implementation of the disclosure, the set of dynamic threshold parameters is a set of one or more parameters.

In the alternative implementation, the method further includes that the associated STA can determines a value of the dynamic channel detection threshold by using the set of dynamic threshold parameters.

In an alternative implementation of the disclosure, the method further includes that the associated STA indicates capability information about whether it supports the dynamic channel detection threshold or not to the AP.

In an alternative implementation of the disclosure, the step that the associated STA judges whether to use the dynamic channel detection threshold for performing the channel detection or not according to the detection information includes that: when the detection information is the information for identifying BSS of the received frame, and the associated STA identifies that the information for identifying BSS of the received frame indicates that the received frame is a frame from the adjacent BSS, it is determined to use the set of dynamic threshold parameters as the dynamic channel detection threshold for performing the channel detection.

In such case, the information for identifying BSS of the received frame is information for distinguishing different BSSs from each other, and the information is in at least one of:

Manner 1: the preamble sequence of the physical layer of the radio frame; and

Manner 2: the signaling of the physical layer or MAC layer of the radio frame.

In an alternative implementation of the disclosure, the step that the associated STA judges whether to use the dynamic channel detection threshold for performing the channel detection or not according to the detection information may be as follows.

When the detection information is the information for identifying BSS of the received frame, the strength of the received signal from the adjacent BSS and the strength of the received signal from the associated BSS, and the associated STA identifies that the information for identifying BSS of the received frame indicates that the received frame is the frame from the adjacent BSS, the strength of the received signal from the adjacent BSS or the strength of the received signal from the associated BSS is taken as a reference value, or a result obtained by specified operation over the strength of the received signal from the adjacent BSS and the strength of the received signal from the associated BSS is taken as the reference value.

Then, the reference value is compared with a threshold value to obtain a result of the comparison, and it is determined whether to use the set of dynamic threshold parameters as the dynamic channel detection threshold for performing the channel detection according to the result of the comparison. The result of the comparison includes, but not limited to, various results such as a result indicating that the reference value is more than the threshold value, a result indicating that the reference value is smaller than the threshold value or the like.

The information for identifying BSS of the received frame may be information for distinguishing different BSSs from each other, and the information is in at least one of:

Manner 1: the preamble sequence of the physical layer of the radio frame;

Manner 2: the signaling of the physical layer or MAC layer of the radio frame.

The strength of the received signal from the adjacent BSS may be the strength of a received signal received by the associated STA from an AP of the adjacent BSS and/or strength of a received signal received by the associated STA from a STA associated with an AP of the adjacent BSS.

The strength of the received signal from the associated BSS is the strength of a received signal received by the associated STA from an AP of the associated BSS.

The specified operation includes: a difference between a mean of the strengths of the received signals from the adjacent BSS and a mean of the strengths of the received signals from the associated BSS and a ratio of the mean of the strengths of the received signals from the adjacent BSS to the mean of the strengths of the received signals from the associated BSS.

In an alternative implementation of the disclosure, the step that the associated STA judges whether to use the dynamic channel detection threshold for performing the channel detection or not according to the detection information may be as follows.

When the detection information is the information for identifying BSS of the received frame and the uplink and downlink indication information of the received frame, and the associated STA identifies that the information for identifying BSS of the received frame indicates that the received frame is the frame from the adjacent BSS and the uplink and downlink indication information of the received frame indicates that the received frame is an uplink frame, it is determined to use the set of dynamic threshold parameters as the dynamic channel detection threshold for performing the channel detection.

The information for identifying BSS of the received frame is information for distinguishing different BSSs from each other, and the information is in at least one of:

Manner 1: the preamble sequence of the physical layer of the radio frame; and

Manner 2: the signaling of the physical layer or MAC layer of the radio frame.

The uplink and downlink indication information of the received frame is information for distinguishing the uplink frame from the downlink frame.

The frames include an uplink frame which is a frame sent to the AP by the associated STA, and a downlink frame which is a frame sent to the associated STA by the AP. The uplink frame is distinguished the downlink frame through the signaling of the physical layer or MAC layer of the radio frame.

In an alternative implementation of the disclosure, the step that the associated STA judges whether to use the dynamic channel detection threshold for performing the channel detection or not according to the detection information may be as follows.

When the detection information is the information for identifying BSS of the received frame, the uplink and downlink indication information of the received frame, the strength of the received signal from the adjacent BSS and the strength of the received signal from the associated BSS, and the associated STA identifies that the information for identifying BSS of the received frame indicates that the received frame is the frame from the adjacent BSS and the uplink and downlink indication information of the received frame indicates that the received frame is an uplink frame, the strength of the received signal from the adjacent BSS or the strength of the received signal from the associated BSS is taken as a reference value, or a result obtained by specified operation over the strength of the received signal from the adjacent BSS and the strength of the received signal from the associated BSS is taken as the reference value.

Then, the reference value is compared with a threshold value to obtain a result of the comparison, and it is determined whether to use the set of dynamic threshold parameters as the dynamic channel detection threshold for performing the channel detection according to the result of the comparison.

The information for identifying BSS of the received frame is information for distinguishing different BSSs from each other, and the information is in at least one of:

Manner 1: the preamble sequence of the physical layer of the radio frame; and

Manner 2: the signaling of the physical layer or MAC layer of the radio frame.

The uplink and downlink indication information of the received frame is information for distinguishing the uplink frame from the downlink frame.

The frames include an uplink frame which is a frame sent to the AP by the associated STA, and a downlink frame which is a frame sent to the associated STA by the AP; the uplink frame is distinguished from the downlink frame through the signaling of the physical layer or MAC layer of the radio frame.

The strength of the received signal from the adjacent BSS is the strength of a received signal received by the associated STA from an AP of the adjacent BSS and/or strength of a received signal received by the associated STA from a STA associated with an AP of the adjacent BSS.

The strength of the received signal from the associated BSS is the strength of a received signal received by the associated STA from an AP of the associated BSS.

The specified operation includes: the difference between the mean of the strengths of the received signals from the adjacent BSS and the mean of the strengths of the received signals from the associated BSS and the ratio of the mean of the strengths of the received signals from the adjacent BSS to the mean of the strengths of the received signals from the associated BSS.

For a sender, there is provided a method for channel detection, including: when an AP allows an associated STA associated with it to use a dynamic channel detection threshold, the AP sends one or more pieces of detection information used by the associated STA and a set of dynamic threshold parameters corresponding to the one or more pieces of detection information.

Figure 3:
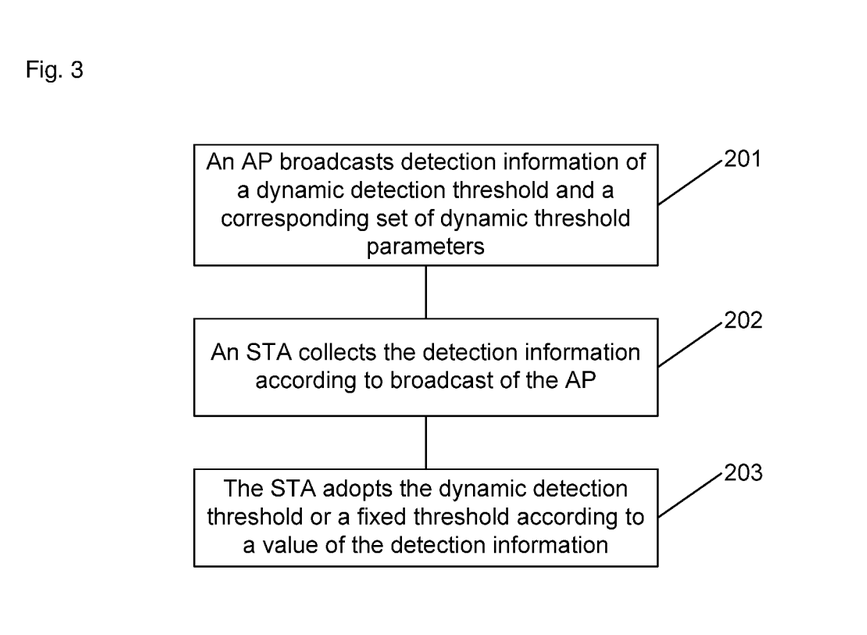
FIG. 3 is a flowchart of another implementation of a method according to the disclosure.

With reference to the steps at the sender and the steps at the receiver, an implementation flow of the disclosure including interaction of the sender and the receiver, as shown in FIG. 3, includes the steps as follows.

In Step 201, an AP broadcasts detection information of a dynamic detection threshold and a corresponding set of dynamic threshold parameters.

In Step 202, an STA collects the detection information according to broadcast of the AP.

In Step 203, the STA adopts the dynamic detection threshold or a fixed threshold according to a value of the detection information.

Figure 4:
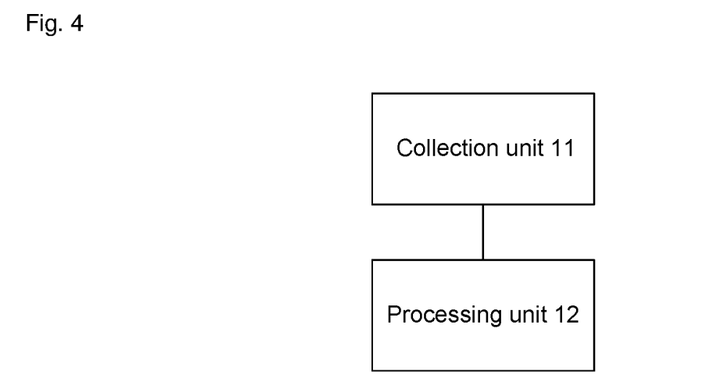
FIG. 4 is a schematic diagram of a structure of a receiving terminal according to the disclosure.

The disclosure provides a receiving terminal, which may be an associated STA associated with an AP, such as an STA. As shown in FIG. 4, the terminal includes: a collection unit 11, which is configured to, when the AP allows the associated STA associated with it to use a dynamic channel detection threshold, collect detection information; and a processing unit 12, which is configured to judge whether to use the dynamic channel detection threshold for performing the channel detection or not according to the detection information.

In an alternative implementation of the disclosure, when the processing unit is configured to judge whether to use the dynamic channel detection threshold for performing the channel detection or not according to the detection information, the detection information being used includes at least one of information for identifying BSS of a received frame, uplink and downlink indication information of the received frame, strength of a received signal from an adjacent BSS and strength of a received signal from an associated BSS.

In an alternative implementation of the disclosure, when the processing unit is configured to judge whether to use the dynamic channel detection threshold for performing the channel detection or not according to the detection information, the detection information being used is the information for identifying BSS of the received frame which is information for distinguishing different BSSs from each other, and the information is in at least one of:

Manner 1: a preamble sequence of a physical layer of the radio frame; and

Manner 2: signaling of the physical layer or MAC layer of the radio frame.

In an alternative implementation of the disclosure, when the processing unit is configured to judge whether to use the dynamic channel detection threshold for performing the channel detection or not according to the detection information, the detection information being used is the uplink and downlink indication information of the received frame which is information for distinguishing an uplink frame from a downlink frame.

The frames include an uplink frame which is a frame sent to the AP by the associated STA, and a downlink frame which is a frame sent to the associated STA by the AP.

The uplink frame is distinguished from the downlink frame through the signaling of the physical layer or MAC layer of the radio frame.

In an alternative implementation of the disclosure, when the processing unit is configured to judge whether to use the dynamic channel detection threshold for performing the channel detection or not according to the detection information, the detection information being used is the strength of the received signal from the adjacent BSS which is strength of a received signal received by the associated STA from an AP of the adjacent BSS and/or strength of a received signal received by the associated STA from a STA associated with an AP of the adjacent BSS.

In an alternative implementation of the disclosure, when the processing unit is configured to judge whether to use the dynamic channel detection threshold for performing the channel detection or not according to the detection information, the detection information being used is the strength of the received signal from the associated BSS which is strength of a received signal received by the associated STA from an AP of the associated BSS.

In an alternative implementation of the disclosure, the receiving terminal further includes a receiving unit, which is configured to receive one or more pieces of detection information notified by the AP in a broadcast manner and used by the associated STA and a set of dynamic threshold parameters corresponding to the one or more pieces of detection information.

In an alternative implementation of the disclosure, the receiving unit is further configured to receive a set of one or more parameters which is taken as the set of dynamic threshold parameters. The receiving terminal further includes a first determination unit, which is configured to determine a value of the dynamic channel detection threshold by using the set of dynamic threshold parameters.

In an alternative implementation of the disclosure, the processing unit is further configured to, when the detection information is the information for identifying BSS of the received frame and it is identified that the information for identifying BSS of the received frame indicates that the received frame is a frame from the adjacent BSS, determine to use the set of dynamic threshold parameters as the dynamic channel detection threshold for performing the channel detection.

In an alternative implementation of the disclosure, the processing unit is further configured to, when the detection information is the information for identifying BSS of the received frame, the strength of the received signal from the adjacent BSS and the strength of the received signal from the associated BSS and it is identified that the information for identifying BSS of the received frame indicates that the received frame is the frame from the adjacent BSS, take the strength of the received signal from the adjacent BSS or the strength of the received signal from the associated BSS as a reference value, or take a result obtained by specified operation over the strength of the received signal from the adjacent BSS and the strength of the received signal from the associated BSS as the reference value. And the processing unit is further configured to compare the reference value with a threshold value to obtain a result of the comparison, and determine whether to use the set of dynamic threshold parameters as the dynamic channel detection threshold for performing the channel detection according to the result of the comparison.

In an alternative implementation of the disclosure, the processing unit is further configured to, when the detection information is the information for identifying BSS of the received frame and the uplink and downlink indication information of the received frame and it is identified that the information for identifying BSS of the received frame indicates that the received frame is the frame from the adjacent BSS and the uplink and downlink indication information of the received frame indicates that the received frame is an uplink frame, determine to use the set of dynamic threshold parameters as the dynamic channel detection threshold for performing the channel detection.

In an alternative implementation of the disclosure, the processing unit is further configured to, when the detection information is the information for identifying BSS of the received frame, the uplink and downlink indication information of the received frame, the strength of the received signal from the adjacent BSS and the strength of the received signal from the associated BSS and it is identified that the information for identifying BSS of the received frame indicates that the received frame is the frame from the adjacent BSS and the uplink and downlink indication information of the received frame indicates that the received frame is an uplink frame, and take the strength of the received signal from the adjacent BSS or the strength of the received signal from the associated BSS as a reference value, or take a result obtained by specified operation over the strength of the received signal from the adjacent BSS and the strength of the received signal from the associated BSS as the reference value. The processing unit is further configured to compare the reference value with a threshold value to obtain a result of the comparison, and determine whether to use the set of dynamic threshold parameters as the dynamic channel detection threshold for performing the channel detection according to the result of the comparison.

The disclosure provides a sending terminal, which may be an AP, such as an AP. The terminal includes: a sending unit configured to, when the AP allows an associated STA associated with it to use a dynamic channel detection threshold, send one or more pieces of detection information used by the associated STA and a set of dynamic threshold parameters corresponding to the one or more pieces of detection information.

Figure 5:
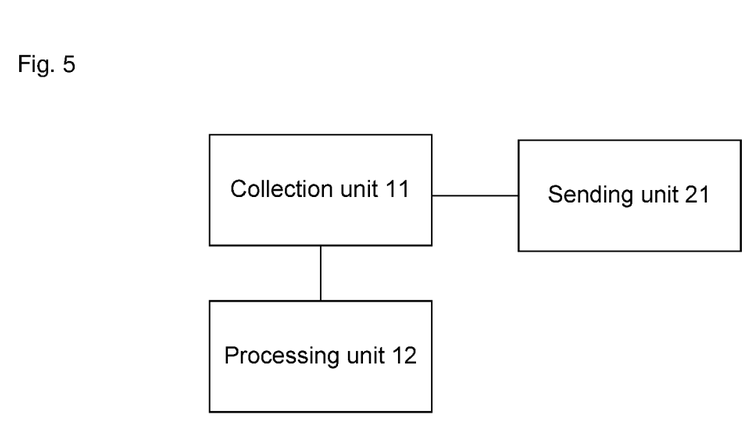
FIG. 5 is a schematic diagram of a structure of a system according to the disclosure.

The disclosure provides a system, which includes the abovementioned receiving terminal and the abovementioned sending terminal. The schematic diagram of a structure of the system is shown in FIG. 5, in which the receiving terminal includes a collection unit 11 and a processing unit 12. The collection unit 11 is configured to, when an AP allows an associated STA associated with it to use a dynamic channel detection threshold, receive detection information. The processing unit 12 is configured to judge whether to use the dynamic channel detection threshold for performing the channel detection or not according to the detection information. The sending terminal includes a sending unit 21 which is configured to, when the AP allows the associated STA associated with it to use the dynamic channel detection threshold, send one or more pieces of detection information used by the associated STA and a set of dynamic threshold parameters corresponding to the one or more pieces of detection information.

Alternative implementations of the system of the disclosure are formed by combining the alternative implementations of the abovementioned receiving terminal and the abovementioned sending terminal, and will not be elaborated herein.

According to the embodiment of the disclosure, the associated STA may collect the detection information according to the detection information broadcast by the AP and judge whether to use the dynamic channel detection threshold or not and the corresponding set of dynamic threshold parameters to be adopted according to a collection result of the detection information. Thus, a channel utilization rate is increased, and system throughput is increased.

The disclosure will be specifically described below.

Embodiment 1

An STA indicates, in a probe request frame or association request message sent by it, capability information about whether it supports a dynamic channel detection threshold or not. When an AP allows the STA associated with it to use the dynamic channel detection threshold, the AP notifies, via a beacon, a probe response frame or an association response message sent to the STA, capability information to indicate whether it supports the dynamic channel detection threshold. At the same time, the AP broadcasts one or more pieces of detection information used by the STA during use of the dynamic channel detection threshold and a set of threshold parameters corresponding to the detection information.

For example, the detection information is information for identifying BSS of a received frame, uplink and downlink indication information of the received frame, strength of a received signal from an adjacent BSS and strength of a received signal from an associated BSS. Then, the AP may notify the detection information and the corresponding set of threshold parameters in a manner shown in Table 1 which provides examples of the parameters of the detection information as follows.

TABLE 1

| Detection information | Situation | Adopted set of threshold parameters |
| --- | --- | --- |
| Information for identifying BSS of the received frame | Frame from the adjacent BSS | Set of dynamic threshold parameters |
| | Frame from the associated BSS | Fixed threshold |
| Information for identifying BSS of the received frame and uplink and downlink information of the received frame | Uplink frame from the associated BSS | Set of dynamic threshold parameters |
| | Other | Fixed threshold |

TABLE 1-continued

| Detection information | Situation | Adopted set of threshold parameters |
|---|---|---|
| Information for identifying BSS of the received frame, as well as strength of the received signal from the adjacent BSS and strength of the received signal from the associated BSS, or a result of specific operation over the strength of the received signal from the adjacent BSS and the strength of the received signal from the associated BSS | Frame from the adjacent BSS, and the strength of the received signal from the adjacent BSS, the strength of the received signal from the associated BSS, or the result of the specific operation over the strength of the received signal from the adjacent BSS and the strength of the received signal from the associated BSS is more than the threshold value | Set of dynamic threshold parameters |
| | Other | Fixed threshold |
| Information for identifying BSS of the received frame, uplink and downlink indication information of the received frame, strength of the received signal from the adjacent BSS, strength of the received signal from the associated BSS, or a result of specific operation over the strength of the received signal from the adjacent BSS and the strength of the received signal from the associated BSS | Uplink frame from the adjacent BSS, and the strength of the received signal from the adjacent BSS, the strength of the received signal from the associated BSS or the result of the specific operation over the strength of the received signal from the adjacent BSS and the strength of the received signal from the associated BSS is more than the threshold value | Set of dynamic threshold parameters |
| | Other | Fixed threshold |

The associated STA supporting the dynamic channel detection threshold receives the capability information of the AP to learn about that the AP supports the dynamic channel detection threshold, and the associated STA collects the detection information according to detection information parameters broadcast by the AP, and judges whether to adopt the set of dynamic threshold parameters or not according to a result of the detection information. Here, the set of dynamic threshold parameters includes one or more parameters which may be used to determine a value of the dynamic channel detection threshold. For example, the set of parameters includes an upper limit value and/or lower limit value and a margin value for a dynamic detection threshold, and may further include a value of a transmitted power range and a value of Modulation and Coding Scheme (MCS) range. The one or more parameters may be used to determine a dynamic detection threshold value to be adopted by the current STA, and the one or more parameters may be regulated according to a situation. A fixed threshold refers to a channel detection threshold value used in the conventional art.

The information for identifying BSS of the received frame refers to information for distinguishing different BSSs from each other. For example, frames from different BSSs adopt different preamble sequences, and after receiving the frame, the STA may analyze a preamble sequence of the frame to judge whether the frame is a frame from an associated BSS or a frame from another BSS through a physical layer. Alternatively, frames of different BSSs are distinguished by indication information contained in a signaling field of the physical layer or a signaling field of a MAC layer, and after receiving the frame, the STA may analyze the signaling field to judge whether the frame is the frame from the associated BSS or the frame from another BSS.

When the associated STA adopts the information for identifying BSS of the received frame as the detection information, the set of dynamic threshold parameters is adopted as the detection threshold if it is identified that the information for identifying BSS of the received frame indicates that the received frame is a frame from the adjacent BSS, and the fixed threshold is still adopted as the detection threshold if it is identified that the information for identifying BSS of the received frame indicates the received frame is a frame from the associated BSS.

Embodiment 2

In the embodiment, when an AP supports an associated STA to use a dynamic channel detection threshold, the associated STA adopts information for identifying BSS of a received frame, strength of a received signal from an adjacent BSS, strength of a received signal from an associated BSS or a result of specific operation over the strength of the received signal from the adjacent BSS and the strength of the received signal from the associated BSS as detection information.

The strength of the received signal from the adjacent BSS refers to strength of a signal received by the STA from the AP or STA of an adjacent BSS. For example, the strength of the received signal from the adjacent BSS is a value of Received Signal Strength Indication (RSSI) of a beacon received by the STA from the AP of the adjacent BSS, or a value of RSSI of the signal received by the STA from the STA of the adjacent BSS. The strength of the received signal from the associated BSS refers to a value of RSSI of a beacon received from the AP of the associated BSS by the STA. RSSI is measured in periodically or during a continuous process.

When the STA receives a radio frame and identifies that the radio frame is a frame from the adjacent BSS through information for identifying BSS of the received frame, the STA may adopt the RSSI of the beacon of the local AP as a reference value, measure a mean of RSSI of beacons of the local AP within a period of time. Then, the STA adopt a set of dynamic threshold parameters if the mean is more than a set threshold value, and adopt a fixed threshold if the mean is smaller than the threshold value. Alternatively, the STA adopts a mean of RSSI of beacons from the AP of the adjacent BSS or a mean of RSSI of signals received from the STA of the adjacent BSS as the reference value, and operates in the same manner, which will not be elaborated.

In addition, the STA may also take a result of specific operation over the strength of the received signal from the adjacent BSS and the strength of the received signal from the associated BSS as the reference value. The specific operation may be: a difference of a mean of the strengths of the received signals from the adjacent BSS and a mean of the strengths of the received signals from the associated BSS, a radio of the mean of the strengths of the received signals from the adjacent BSS to the mean of the strengths of the received signals from the associated BSS and the like. When the STA receives a radio frame and identifies that the radio frame is a frame from the associated BSS through information for identifying BSS of the received frame and performs specific operation over the strength of the received signal from the adjacent BSS and the strength of the received signal from the associated BSS, the set of dynamic threshold parameters is adopted if an operation result is more than the threshold value, and the fixed threshold is adopted if the operation result is smaller than the threshold value.

Embodiment 3

In the embodiment, an associated STA adopts information for identifying BSS of a received frame and uplink and downlink indication information of the received frame as detection information.

When receiving a frame, the associated STA judges whether the frame is a frame from a BSS of an adjacent BSS or not according to information for identifying BSS of the frame at first, and then judges whether the received frame is an uplink frame or downlink frame from the adjacent BSS according to the uplink and downlink indication information of the received frame. The STA then adopts a dynamic channel detection threshold if the received frame is a frame from the adjacent BSS and is an uplink frame.

Embodiment 4

In the embodiment, an associated STA adopts information for identifying BSS of a received frame, uplink and downlink indication information of the received frame, strength of a received signal from an adjacent BSS, strength of a received signal from an associated BSS, or a result of specific operation over the strength of the received signal from the adjacent BSS and the strength of the received signal from the associated BSS as detection information.

When receiving a radio frame, the associated STA makes a judgment according to information for identifying BSS and uplink and downlink indication information of the received frame. When determining that the received frame is an uplink frame from the adjacent BSS, the STA may adopt RSSI of a beacon from a local AP as a reference value, measure a mean of RSSI of beacons from the local AP within a period of time. Then the STA adopts a set of dynamic threshold parameters if the mean is more than a set threshold value and adopts a fixed threshold if the mean is smaller than the set threshold value. Alternatively, the STA adopts a mean of RSSI of beacons from an AP of the adjacent BSS or a mean of RSSI of signals received from an STA of the adjacent BSS as the reference value. Then, the STA adopts the set of dynamic threshold parameters when the mean is more than the set threshold value, and adopts the fixed threshold when the mean is smaller than the set threshold value. Alternatively, the STA may also adopt the result of the specific operation over the strength of the received signal from the adjacent BSS and the strength of the received signal from the associated BSS as the reference value. Then, the STA adopts the set of dynamic threshold parameters when the result of the operation is more than a threshold value, and adopts the fixed threshold when the result of the operation is smaller than the threshold value.

If being implemented in form of software function module and sold or used as independent products, the integrated modules of the embodiment of the disclosure may also be stored in a computer-readable storage medium. Based on such an understanding, the technical solutions of the embodiment of the disclosure may substantially or parts contributing to the conventional art may be embodied in form of software product, and the computer software product may be stored in a storage medium, including a plurality of instructions configured to enable a piece of computer apparatus (which may be a personal computer, a server, network apparatus or the like) to execute all or part of the methods of the respective embodiments of the disclosure. The storage medium includes various media capable of storing program codes, such as a U disk, a mobile hard disk, a Read-Only Memory (ROM), a Random Access Memory (RAM), a magnetic disk or a compact disc. Therefore, the embodiment of the disclosure is not limited to any specific combination of hardware and software.

Correspondingly, the embodiment of the disclosure further provides a computer storage medium having stored therein a computer program for executing the method for channel detection of the embodiment of the disclosure.

The above is only the alternative embodiment of the disclosure and not intended to limit the scope of protection of the disclosure.

INDUSTRIAL APPLICABILITY

According to the method of the disclosure, when the AP allows the associated STA associated with it to use the dynamic channel detection threshold, the associated STA collects the detection information; and the associated STA judges whether to use the dynamic channel detection threshold for performing the channel detection or not according to the detection information. With adoption of the method of the disclosure, the associated STA may judge whether to use the dynamic channel detection threshold for performing the channel detection or not according to the detection information sent by the AP, so that the problem of how to use a detection threshold for performing the channel detection is solved.

What is claimed is:
1. A method for channel detection, comprising:
when an Access Point (AP) allows an associated Station (STA) associated with the AP to use a dynamic channel detection threshold, collecting, by the associated STA, detection information, wherein the associated STA receives the detection information notified by the AP in a broadcast manner and used by the associated STA and a set of dynamic threshold parameters corresponding to the detection information; and judging, by the associated STA, whether to use the dynamic channel detection threshold for performing the channel detection or not according to the detection information, wherein judging, by the associated STA, whether to use the dynamic channel detection threshold for performing the channel detection or not according to the detection information comprises:

when the detection information is information for identifying Basic Service Set (BSS) of a received frame and it is identified by the associated STA that the information for identifying BSS of the received frame indicates that the received frame is a frame from an adjacent BSS, determining to use the set of dynamic threshold parameters as the dynamic channel detection threshold for performing the channel detection;

or wherein judging, by the associated STA, whether to use the dynamic channel detection threshold for performing the channel detection or not according to the detection information comprises:

when the detection information is the information for identifying BSS of the received frame, a strength of a received signal from the adjacent BSS and a strength of a received signal from the BSS, and it is identified by the associated STA that the information for identifying BSS of the received frame indicates that the received frame is the frame from the adjacent BSS, taking the strength of the received signal from the adjacent BSS or the strength of the received signal from the BSS as a reference value, or taking a result obtained by specified operation over the strength of the received signal from the adjacent BSS and the strength of the received signal from the BSS as the reference value; and comparing the reference value with a threshold value to obtain a result of the comparison, and determining whether to use the set of dynamic threshold parameters as the dynamic channel detection threshold for performing the channel detection according to the result of the comparison;

or wherein judging, by the associated STA, whether to use the dynamic channel detection threshold for performing the channel detection or not according to the detection information comprises:

when the detection information is the information for identifying BSS of the received frame and uplink and downlink indication information of the received frame, and it is identified by the associated STA that the information for identifying BSS of the received frame indicates that the received frame is the frame from the adjacent BSS and the uplink and downlink indication information of the received frame indicates that the received frame is an uplink frame, determining to use the set of dynamic threshold parameters as the dynamic channel detection threshold for performing the channel detection;

or wherein judging, by the associated STA, whether to use the dynamic channel detection threshold for performing the channel detection or not according to the detection information comprises:

when the detection information is the information for identifying BSS of the received frame, the uplink and downlink indication information of the received frame, the strength of the received signal from the adjacent BSS and the strength of the received signal from the BSS, and it is identified by the associated STA that the information for identifying BSS of the received frame indicates that the received frame is the frame from the adjacent BSS and the uplink and downlink indication information of the received frame indicates that the received frame is an uplink frame, taking the strength of the received signal from the adjacent BSS or the strength of the received signal from the BSS as a reference value, or taking a result obtained by specified operation over the strength of the received signal from the adjacent BSS and the strength of the received signal from the BSS as the reference value; and comparing the reference value with a threshold value to obtain a result of the comparison, and determining whether to use the set of dynamic threshold parameters as the dynamic channel detection threshold for performing the channel detection according to the result of the comparison.

2. The method according to claim 1, wherein the detection information comprises at least one of: the information for identifying BSS of the received frame, the uplink and downlink indication information of the received frame, the strength of the received signal from the adjacent BSS, and the strength of the received signal from the BSS.

3. The method according to claim 1, wherein the information for identifying BSS of the received frame is information for distinguishing different BSSs from each other, and the information is in at least one of:

Manner 1: a preamble sequence of a physical layer of a radio frame; or

Manner 2: signaling of the physical layer or Media Access Control (MAC) layer of the radio frame.

4. The method according to claim 1, wherein the uplink and downlink indication information of the received frame is information for distinguishing an uplink frame from a downlink frame;

the frames comprise an uplink frame which is a frame sent to the AP by the associated STA, and a downlink frame which is a frame sent to the associated STA by the AP; and the uplink frame is distinguished from the downlink frame through signaling of a physical layer or MAC layer of a radio frame.

5. The method according to claim 1, wherein the strength of the received signal from the adjacent BSS is at least one of:

strength of a received signal received by the associated STA from an AP of the adjacent BSS; or strength of a received signal received by the associated STA from a STA associated with the AP of the adjacent BSS.

6. The method according to claim 1, wherein the strength of the received signal from the BSS is strength of a received signal received by the associated STA from an AP of the BSS.

7. The method according to claim 1, wherein the set of dynamic threshold parameters is a set of one or more parameters; and the method further comprises: determining, by the associated STA, a value of the dynamic channel detection threshold by using the set of dynamic threshold parameters.

8. The method according to claim 1, further comprising: indicating, by the associated STA, capability information about whether the associated STA supports the dynamic channel detection threshold or not to the AP.

9. A receiving terminal, comprising:

a collection unit configured to, when an Access Point (AP) allows an associated Station (STA) associated with the AP to use a dynamic channel detection threshold, collect detection information;

a receiving unit configured to receive the detection information notified by the AP in a broadcast manner and used by the associated STA and a set of dynamic threshold parameters corresponding to the detection information; and a processing unit configured to judge whether to use the dynamic channel detection threshold for performing channel detection or not according to the detection information, wherein the processing unit is further configured to, when the detection information is information for identifying Basic Service Set (BSS) of a received frame and it is identified that the information for identifying BSS of the received frame indicates that the received frame is a frame from an adjacent BSS, determine to use the set of dynamic threshold parameters as the dynamic channel detection threshold for performing the channel detection;

or wherein the processing unit is further configured to, when the detection information is the information for identifying BSS of the received frame, a strength of a received signal from the adjacent BSS and a strength of a received signal from the BSS and it is identified that the information for identifying BSS of the received frame indicates that the received frame is the frame from the adjacent BSS, take the strength of the received signal from the adjacent BSS or the strength of the received signal from the BSS as a reference value, or take a result obtained by specified operation over the strength of the received signal from the adjacent BSS and the strength of the received signal from the BSS as the reference value; and compare the reference value with a threshold value to obtain a result of the comparison, and determine whether to use the set of dynamic threshold parameters as the dynamic channel detection threshold for performing the channel detection according to the result of the comparison;

or wherein the processing unit is further configured to, when the detection information is the information for identifying BSS of the received frame and uplink and downlink indication information of the received frame and it is identified that the information for identifying BSS of the received frame indicates that the received frame is the frame from the adjacent BSS and the uplink and downlink indication information of the received frame indicates that the received frame is an uplink frame, determine to use the set of dynamic threshold parameters as the dynamic channel detection threshold for performing the channel detection;

or wherein the processing unit is further configured to, when the detection information is the information for identifying BSS of the received frame, the uplink and downlink indication information of the received frame, the strength of the received signal from the adjacent BSS and the strength of the received signal from the BSS and it is identified that the information for identifying BSS of the received frame indicates that the received frame is the frame from the adjacent BSS and the uplink and downlink indication information of the received frame indicates that the received frame is an uplink frame, take the strength of the received signal from the adjacent BSS or the strength of the received signal from the BSS as a reference value, or take a result obtained by specified operation over the strength of the received signal from the adjacent BSS and the strength of the received signal from the BSS as the reference value; and compare the reference value with a threshold value to obtain a result of the comparison, and determine whether to use the set of dynamic threshold parameters as the dynamic channel detection threshold for performing the channel detection according to the result of the comparison.

10. The receiving terminal according to claim 9, wherein, when the processing unit is configured to judge whether to use the dynamic channel detection threshold for performing the channel detection or not according to the detection information, the detection information being used comprises at least one of: the information for identifying BSS of the received frame, the uplink and downlink indication information of the received frame, the strength of the received signal from the adjacent BSS and the strength of the received signal from the BSS.

11. The receiving terminal according to claim 9, wherein, when the processing unit is configured to judge whether to use the dynamic channel detection threshold for performing the channel detection or not according to the detection information, the detection information being used is the information for identifying BSS of the received frame which is information for distinguishing different BSSs from each other, and the information is in at least one of:

Manner 1: a preamble sequence of a physical layer of a radio frame; or

Manner 2: signaling of the physical layer or Media Access Control (MAC) layer of the radio frame.

12. The receiving terminal according to claim 9, wherein, when the processing unit is configured to judge whether to use the dynamic channel detection threshold for performing the channel detection or not according to the detection information, the detection information being used is the uplink and downlink indication information of the received frame which is information for distinguishing an uplink frame from a downlink frame;

the frames comprise an uplink frame which is a frame sent to the AP by the associated STA, and a downlink frame which is a frame sent to the associated STA by the AP; and the uplink frame is distinguished from the downlink frame through the signaling of a physical layer or MAC layer of a radio frame.

13. The receiving terminal according to claim 9, wherein, when the processing unit is configured to judge whether to use the dynamic channel detection threshold for performing the channel detection or not according to the detection information, the detection information being used is the strength of the received signal from the adjacent BSS which is at least one of:

strength of a received signal received by the associated STA from an AP of the adjacent BSS; or strength of a received signal received by the associated STA from a STA associated with the AP of the adjacent BSS.

14. The receiving terminal according to claim 9, wherein, when the processing unit is configured to judge whether to use the dynamic channel detection threshold for performing the channel detection or not according to the detection information, the detection information being used is the strength of the received signal from the BSS which is strength of a received signal received by the associated STA from an AP of the BSS.

15. The receiving terminal according to claim 9, wherein the receiving unit is further configured to receive a set of one or more parameters which is taken as the set of dynamic threshold parameters; and the receiving terminal further comprises a first determination unit configured to determine a value of the dynamic channel detection threshold by using the set of dynamic threshold parameters.

* * * * *